US007454508B2

(12) United States Patent
Mathew et al.

(10) Patent No.: US 7,454,508 B2
(45) Date of Patent: Nov. 18, 2008

(54) CONSENT MECHANISM FOR ONLINE ENTITIES

(75) Inventors: Ashvin J. Mathew, Kirkland, WA (US); Puhazholi Vetrivel, Redmond, WA (US); Brian Jones, Duvall, WA (US); Danpo Zhang, Issaquah, WA (US); Laurel S. Abbott, Kirkland, WA (US); Cem Paya, Seattle, WA (US); Melissa Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

(21) Appl. No.: 10/346,885

(22) Filed: Jan. 15, 2003

(65) Prior Publication Data

US 2004/0003072 A1 Jan. 1, 2004

Related U.S. Application Data

(63) Continuation-in-part of application No. 10/187,408, filed on Jun. 28, 2002, now Pat. No. 7,302,488.

(60) Provisional application No. 60/406,218, filed on Aug. 27, 2002.

(51) Int. Cl.
*G06F 15/16* (2006.01)

(52) U.S. Cl. .......................... 709/229; 726/4

(58) Field of Classification Search ................ 709/223, 709/229; 726/4
See application file for complete search history.

(56) References Cited

U.S. PATENT DOCUMENTS

| | | | | |
|---|---|---|---|---|
| 5,739,734 | A * | 4/1998 | Chen et al. ................. 333/210 |
| 5,806,043 | A * | 9/1998 | Toader ......................... 405/14 |
| 5,889,958 | A * | 3/1999 | Willens ....................... 709/229 |
| 5,987,611 | A * | 11/1999 | Freund ........................... 726/4 |
| 6,088,801 | A * | 7/2000 | Grecsek ......................... 726/1 |
| 6,229,894 | B1 * | 5/2001 | Van Oorschot et al. ....... 713/150 |
| 6,564,327 | B1 * | 5/2003 | Klensin et al. ................. 726/7 |
| 6,904,410 | B1 * | 6/2005 | Weiss et al. .................... 705/27 |
| 7,076,558 | B1 * | 7/2006 | Dunn ......................... 709/229 |
| 7,089,246 | B1 * | 8/2006 | O'Laughlen .................. 707/10 |
| 7,131,132 | B1 * | 10/2006 | Gehlot et al. .................. 725/10 |
| 7,302,488 | B2 * | 11/2007 | Mathew et al. .............. 709/229 |
| 2001/0047485 | A1 * | 11/2001 | Brown et al. ................. 713/201 |
| 2002/0032857 | A1 * | 3/2002 | Kon et al. .................... 713/156 |
| 2002/0120866 | A1 * | 8/2002 | Mitchell et al. .............. 713/201 |
| 2002/0184534 | A1 * | 12/2002 | Rangan et al. ............... 713/201 |
| 2003/0079133 | A1 * | 4/2003 | Breiter et al. ................ 713/182 |
| 2004/0003079 | A1 * | 1/2004 | Aiu et al. ..................... 709/225 |
| 2004/0039911 | A1 * | 2/2004 | Oka et al. .................... 713/175 |

\* cited by examiner

*Primary Examiner*—Douglas B Blair
(74) *Attorney, Agent, or Firm*—Christensen O'Connor Johnson Kindness PLLC

(57) ABSTRACT

A method, system, and computer-readable medium are provided for managing consent between online entities to perform tasks. The consent mechanism uses an asynchronous protocol for submitting consent requests, managing consent requests, and resolving consent requests. An application that requires consent to perform a task submits a request for consent to the consent mechanism. The resolving authority obtains pending request information from the consent mechanism and sends the consent mechanism request resolution information. The application obtains resolved request information from the consent mechanism. If the resolved request is approved, the consent mechanism allows the application to perform the task. If the resolved request is denied, the consent mechanism does not allow the application to perform the task.

20 Claims, 12 Drawing Sheets

CONSENT MECHANISM FOR ONLINE ENTITIES

CROSS-REFERENCE TO RELATED APPLICATIONS

This application is a continuation-in-part of U.S. application Ser. No. 10/187,408, filed Jun. 28, 2002, now U.S. Pat. No. 7,302,488 entitled "Parental Controls Customization and Notification," the subject matter of which is incorporated herein by reference and the benefit of the filing date of which is claimed under 35 U.S.C. § 120. This application also claims, under 35 U.S.C. § 119, the benefit of the filing date of U.S. Provisional Application No. 60/406,218, filed Aug. 27, 2002.

FIELD OF THE INVENTION

This invention relates to computer software and, in particular, to a method and system for controlling operations performed across a network.

BACKGROUND OF THE INVENTION

Today's Internet is used to perform an ever-increasing number and variety of online tasks. Consequently, the ability to control online tasks has never been more important. Users want to be able to control the actions that applications may take on their behalf. For instance, users want to be able to control online actions taken on their behalf for privacy and security reasons. As another example, users want to control online actions that involve accessing the users' profile information, financial information, and preferences. Parents want control over the online actions performed by their children. Administrators of online accounts want control over users' online actions. Schools and libraries want to control what users do while online. In essence, users want to be able to require applications to obtain consent to perform certain online actions on their behalf or the behalf of others before the actions are taken.

Many online actions today already require consent before the online task can be completed. Laws have been passed that mandate that Web sites control the performance of certain online actions. For example, in 1998, the Children's Online Privacy Protection Act ("COPPA") was passed to prevent Web sites from gathering personal information from children under the age of 13 without the approval of a consenting adult. Web sites often require obtaining consent from users to terms of use the first time a user accesses the site and anytime the terms of use change. Such laws and requirements have developed a need for ways for Web sites to increase their control over online actions that applications perform on behalf of users.

In summary, for various reasons, a need exists for ways of controlling online actions, not only on user online actions, but also the online actions of applications, such as Web services. As the demand for controlling online actions and providing consent to applications to perform online actions grows, so too does the need for a system for controlling online actions and consent for online actions.

SUMMARY OF THE INVENTION

The present invention addresses the above needs by providing a consent mechanism for managing consent to perform tasks between online entities.

In accordance with a first aspect of the present invention, a method for requesting, managing, and resolving consent requests from an application that requires consent to perform a task on behalf of a first user is provided. In response to the receipt of a request from an application for consent to perform a task on behalf of a first user, a second user who has authority to resolve the consent request is identified. In response to receiving the consent request resolution information from the second user, the computer analyzes the consent request resolution information to determine if the consent request is approved. If the consent request is determined to be approved, the application is allowed to perform the task.

In accordance with a second aspect of the present invention, a computer-readable medium having computer-executable instructions for requesting, managing, and resolving consent requests from an application that requires consent to perform a task on behalf of a first user is provided. When a computer executing the instructions receives a request from an application for consent to perform a task on behalf of a first user, the executing instructions cause the computer to identify a second user who has authority to resolve the consent request. In response to the computer's receiving consent request resolution information from the second user, the executing instructions cause the computer to analyze the consent request resolution information to determine if the consent request is approved. If the computer determines that the consent request is approved, the executing instructions allow the application to perform the task.

In accordance with a third aspect of the present invention, a computer system is provided for (i) receiving a request from an application for consent to perform a task on behalf of a first user; (ii) receiving consent request resolution information from a second user, who is authorized to resolve the consent request; (iii) analyzing the consent request resolution information to determine if the consent request is approved; and (iv) if the consent request is determined to be approved, allowing the application to perform the task. More specifically, the computer system includes a consent mechanism component for receiving a request from an application for consent to perform a task on behalf of a first user. In response to the consent mechanism's receiving the consent request, the consent mechanism queries an association service component for the identity of a second user who has authority to resolve the consent request. In response to receiving the query from the consent service, the association service identifies a second user who has authority to resolve the consent request and returns the identity of the second user to the consent mechanism. The consent mechanism uses the identity information to verify such consent request resolution information. In response to receiving consent request resolution information from the second user, the consent mechanism analyzes the consent request resolution information to determine if the consent request is approved. If the consent mechanism determines that the consent request is approved, the consent mechanism allows the application to perform the task.

In accordance with a fourth aspect of the present invention, a consent mechanism for requesting, managing, and resolving consent requests from an application that requires consent to perform a task on behalf of a first user is provided. The consent mechanism includes a first means for submitting a consent request in response to receiving a request from an application for consent to perform a task on behalf of a first user. The consent mechanism includes a second means for providing consent request information to a second user who has authority to resolve the consent request in response to receiving a request from the second user. The consent mechanism includes a third means for resolving a consent request in response to receiving consent request resolution information from the second user.

In accordance with a fifth aspect of the present invention, a computer-readable medium having a data structure stored thereon suitable for creating an entry in a consent database for a request from an application that requires consent to perform a task on behalf of the first user is provided. The data structure includes a data element containing request identification information, a data element containing first user identification information, a data element containing second user identification information, said second user identification information identifying a user who has authority to resolve the request, a data element containing task description information, and a data element containing request status information.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF A PREFERRED EMBODIMENT

The detailed description that follows is in terms of processes and symbolic representations of operations by conventional computer components, including a processor, memory storage devices for the processor, connected display devices, and input devices. These described processes and operations may utilize conventional computer components in a heterogeneous distributed computing environment, including remote file servers, computer servers, and memory storage devices. Each of these conventional distributed computing components is accessible by the processor via a communication network.

Figure 1:
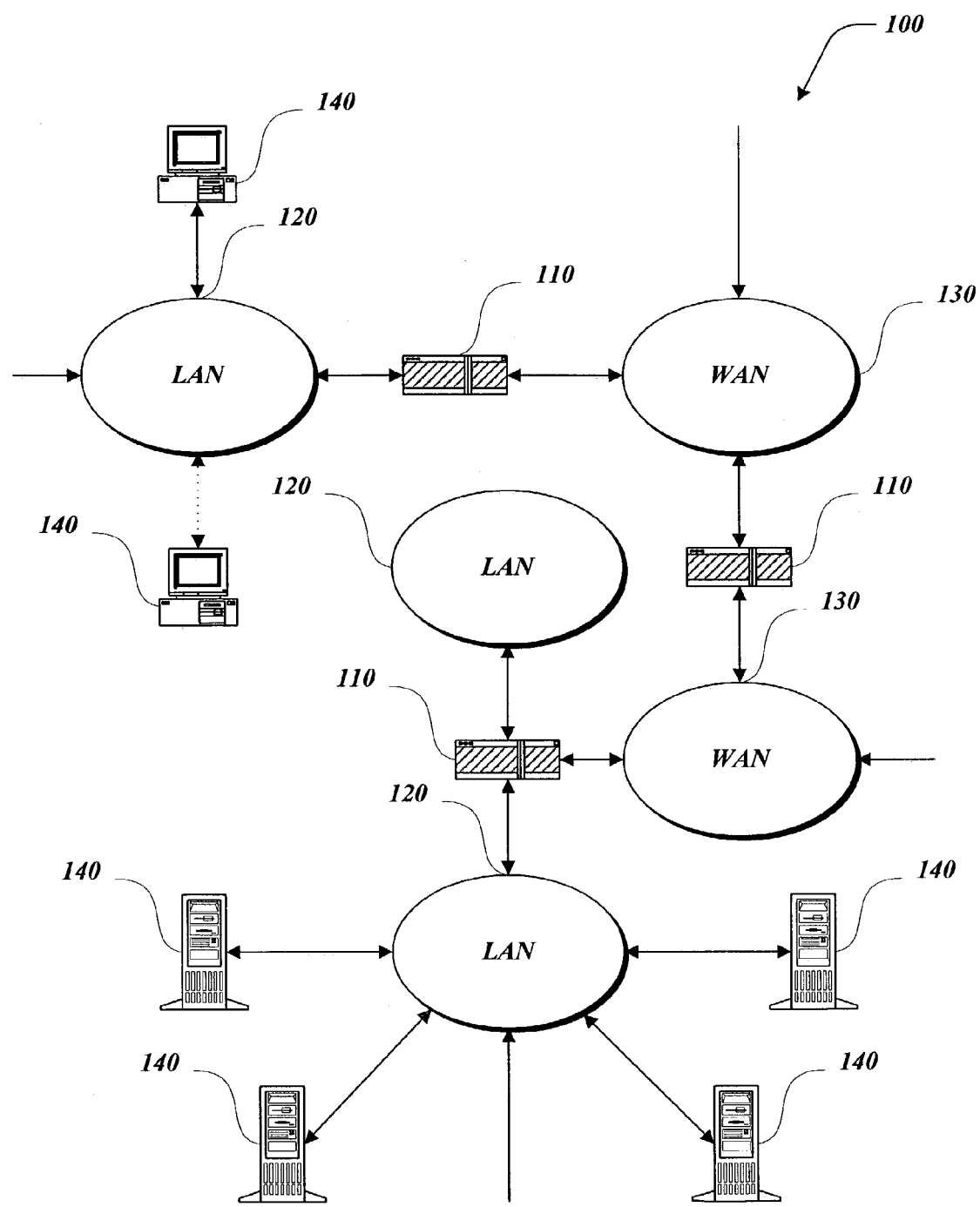
FIG. 1 is an illustration of a representative portion of an internetwork network, such as the Internet.

The term "Internet" refers to a collection of networks and routers capable of communicating with one another. A representative section of the Internet 100 is shown in FIG. 1. The representation section of the Internet 100 shown in FIG. 1 includes a plurality of local area networks (LANs) 120 and wide area networks (WANs) 130 interconnected by routers 110. The routers 110 are generally special purpose computers used to interface one LAN or WAN to another. Communication links within the LANs may be formed by twisted pair wire, coaxial cable, or any other well-known communication linkage technology, including wireless technology. Communication links between networks may be formed by 56 Kbps analog telephone lines, or 1 Mbps digital T-1 lines, and/or 45 Mbps T-3 lines or any other well-known communication linkage technology, including wireless technology. Further, computers and other related electronic devices 140 can be remotely connected to either the LANs 120 or the WANs 130 via a modem and temporary telephone link, including a wireless telephone link. Such computers and electronic devices 140 are shown in FIG. 1 as connected to one of the LANs 120. It will be appreciated that the Internet 100 comprises a vast number of such interconnected networks, computers, and routers and that only a small, representative section of the Internet 100 is shown in FIG. 1.

The Internet 100 has recently seen explosive growth by virtue of its ability to link computers located throughout the world. As the Internet has grown, so has the World Wide Web ("WWW" or the "Web"). As is appreciated by those of ordinary skill in the art, the Web is a vast collection of interconnected or "hypertext" documents (also known as "Web pages"), written in HyperText Markup Language ("HTML"), or other markup languages, that are electronically stored at "Web sites" throughout the Internet. Other markup languages include Standard Generalized Markup Language ("SGML") and eXtensible Markup Language ("XML"), a condensed form of SGML. A Web site is a server connected to the Internet 100 that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a Web site elsewhere on the Internet. Each hyperlink is associated with a Uniform Resource Locator ("URL") that provides the exact location of the linked document on a server connected to the Internet and describes the document. Thus, whenever a hypertext document is retrieved from any Web server, the document is considered to be retrieved from the WWW. As is known to those of ordinary skill in the art, a Web server may also include facilities for storing and transmitting application programs, such as applications written in the JAVA® programming language from Sun Microsystems, for execution on a remote computer. Likewise, a Web server may also include facilities for executing scripts and other application programs on the Web server itself.

A remote user may retrieve hypertext documents from the WWW via a Web browser application program. A Web browser, such as Netscape's NAVIGATOR® or Microsoft's INTERNET EXPLORER®, is a software application for providing a graphical user interface to the WWW. Upon request from the user via the Web browser, the Web browser accesses and retrieves the desired hypertext document from the appropriate Web server using the URL for the document and a protocol known as HyperText Transfer Protocol ("HTTP").

HTTP is a higher-level protocol than the Transmission Control Protocol/Internet Protocol (TCP/IP) and is designed specifically for the requirements of the WWW. It is used on top of TCP/IP to transfer hypertext documents between servers and clients. The Web browser may also retrieve application programs from the Web server, such as JAVA Applets, for execution on the user's computer. A Web service is a modular collection of Web protocol-based applications that can be mixed and matched to provide business functionality through an Internet connection. Web services can be used over the Internet or an intranet to create products, business processes, and business-to-business interactions. Web services use standard Internet protocols such as HTTP, XML, and Simple Object Access Protocol ("SOAP"), which is an XML-based protocol for exchanging structured and type information on the Web, to provide connectivity and interoperability between companies.

Figure 2A:
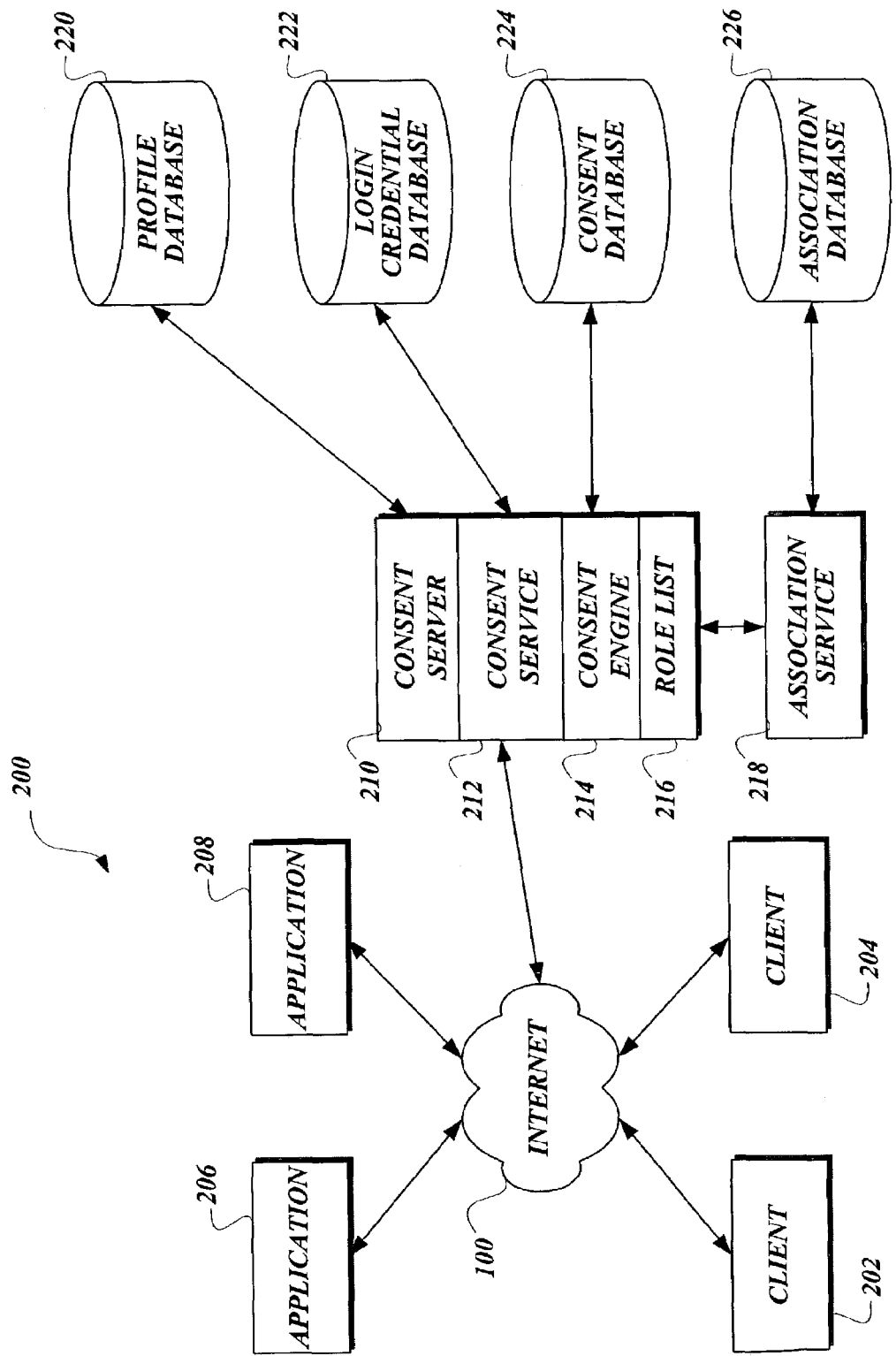
FIG. 2A is a block diagram illustrative of a system architecture in accordance with one exemplary embodiment of the present invention.

FIG. 2A is a block diagram of a system 200 for providing a consent mechanism for managing consent requests between online entities in accordance with one embodiment of the present invention. The system 200 generally operates in a distributed computer environment comprising individual computer systems connected together over a network (such as the Internet 100). The system 200 shown in FIG. 2A includes clients 202 and 204, applications 206 and 208, a consent server 210, and an association service 218. In the illustrated embodiment, the consent server 210 includes a consent service 212, a consent engine 214, and a role list 216. In the illustrated embodiment, the system 200 includes an association database 226, a consent database 224, a login credential database 222, and a profile database 220. FIG. 2A illustrates that the consent server 210 is in communication with the association service 218 as well as the profile database 220 and the consent database 224. In alternative embodiments of the present invention, the consent service 212, consent engine 214, and role list 216 may reside on other servers that are in communication with the consent server 210. Additionally, though only two clients 202 and 204 are shown in FIG. 2A, it will be appreciated that many clients may be included in the system 200. Similarly, while only two applications 206 and 208 are shown in FIG. 2A, it will be appreciated that many other applications may be connected to the related internetwork—the Internet 100—in the illustrated embodiment of the invention.

The consent service 212 illustrated in FIG. 2A includes an application programming interface ("API"). An API is a set of methods used by an application program to direct the performance of procedures by the computer's operating system. The consent service 212 API includes methods for querying for a request, submitting a request, and resolving a request. In one embodiment, the consent service 212 exposes various methods including a submit request method, a query request method, a query by request ID method, a query by attributes method, and a resolve request method.

In one embodiment, the consent service 212 is implemented as a Simple Object Access Protocol ("SOAP") interface, which is an XML-based protocol for exchanging structured and type information on the Web. In one embodiment, the submit request method is called by an online entity that requires consent to perform a task on behalf of a user. For example, an application acting on behalf of a user may call the submit request API method to request consent to perform a task. The submit request method parameters may include information about the identity of the user requesting the task, the description of the requested task, and the request ID. The request ID is returned to the calling entity upon successful completion of the submit request method. In one embodiment, the submit request method creates a new request for consent by creating an entry for the request in the consent database 224. The consent database 224 entry may utilize a data structure that includes a unique request ID, a unique identifier or sign-in name of the user requesting the task, a unique identifier or sign-in name of the user who is the resolving authority, a task description, and a request status. The unique request ID may be generated by the submit request method. The submit request method may also send notification to the resolving authority about the pending request for consent. The pending request notification may be sent using electronic mail, instant messaging, or the like. In this embodiment, the submit request method obtains information about the resolving authority using the association service 218, described below with reference to FIGS. 2A and 2B.

The query request method may be called by a resolving authority to obtain information about pending consent requests. The query request method may also be called by an application to obtain information about resolved requests. The query request method parameters may include the user identifier, on whose behalf the request is made, and a string describing the set of requests to be returned. The query request method searches the consent database 224 for the requests. The query request method returns the search results in an array. In one embodiment, the search results include information about each found request, which includes the request ID, the description of the requested task, the request status (pending/approve/deny/delete), the user identity of the request creator, and the last modified user identity.

The query by request ID method may be called by a resolving authority to obtain information about pending consent requests. The query by request ID method may also be called by an application to obtain information about resolved requests. The query by request ID method parameters may include the number of elements in a request IDs array, an array of the request IDs, and a query results string. In one embodiment, the query results are returned in XML format and include information about each found request, including the request ID, the user ID, the creator user ID, the request type, and the request status. The query by request ID method searches the consent database 224 for the requests that have a request ID that matches the value of the request ID input parameter.

The query by attributes method may be called by a resolving authority to obtain information about pending consent requests. The query by attributes method may also be called by an application to obtain information about resolved requests. The query by attributes method parameters may include the number of elements in a resolving authority array, an array of resolving authority identities, the number of elements in an array of users on whose behalf the request is made, an array of users' identities, the number of elements in the request status array, an array of request status, the number of elements in the request type array, the array of request types, and a query results string. The query results are returned in XML format and include information about each found request, including the request ID, the user ID, the creator user ID, the request type, and the request status. The query by request ID method searches the consent database 224 for the requests that have a request ID that matches the value of the request ID input parameter.

In one embodiment, the resolve request method is called by the resolving authority to resolve a request for consent from an application to perform a task on behalf of a user. The resolve request method parameters may include the request ID and a resolved status. The resolved status parameter has enumerated values for approve, deny, and delete. In one embodiment, the resolve request method resolves the request by updating the request status for the request entry in the consent database 224 in accordance with the resolved status parameter, i.e., approve, deny, or delete. The resolve request method may also send notification to the application requesting consent about the resolved request for consent. The resolved request notification may be sent using electronic mail, instant messaging, or the like. In this embodiment, the resolve request method obtains and verifies information about the resolving authority using the association service 218, described below with reference to FIGS. 2A-2C.

The association service 218 illustrated in FIG. 2A includes an application programming interface ("API") with a method for querying associations in the association database 226. The query association method may be used to determine if there is an online entity that has been approved as having authority to grant consent for an online task. In one embodiment, the association database 226 stores information about associations between users of online identities. In another embodiment, the association database also stores information about a consent policy that acts as a rule to define the association between the associated online identities. For example, an association can be based on a parental controls policy, a COPPA policy, or a school policy. For a more detailed description of an association service, attention is directed to U.S. Provisional Application No. 60/406,274, filed Aug. 2, 2002, entitled "Method and System for Enforcing Consent Policies on Online Identities," the subject matter of which is incorporated herein by reference.

As illustrated in FIG. 2A, one embodiment of the present invention provides a role list 216 residing on the consent server 210. The role list 216 includes an ordered list of rules that are used for providing the automatic resolution feature of the present invention. In one embodiment, each rule in the role list 216 includes a task syntax and a rule definition. The task syntax is a schema utilized for describing and validating task data. The rule definition specifies how a request for consent to perform a task is to be resolved. For example, a role list for a parent may include a rule that access to all sites be approved for the child. As another example, a manager role list may include a rule that any request from the manager be approved. A rule may be defined by an online entity, such as an application acting on behalf of a user. For example, a parental controls application acting on behalf of a parent may define a rule. The use of the role list 216 in providing the automatic resolution feature of the present invention is described below with reference to FIG. 7.

Figure 2B:
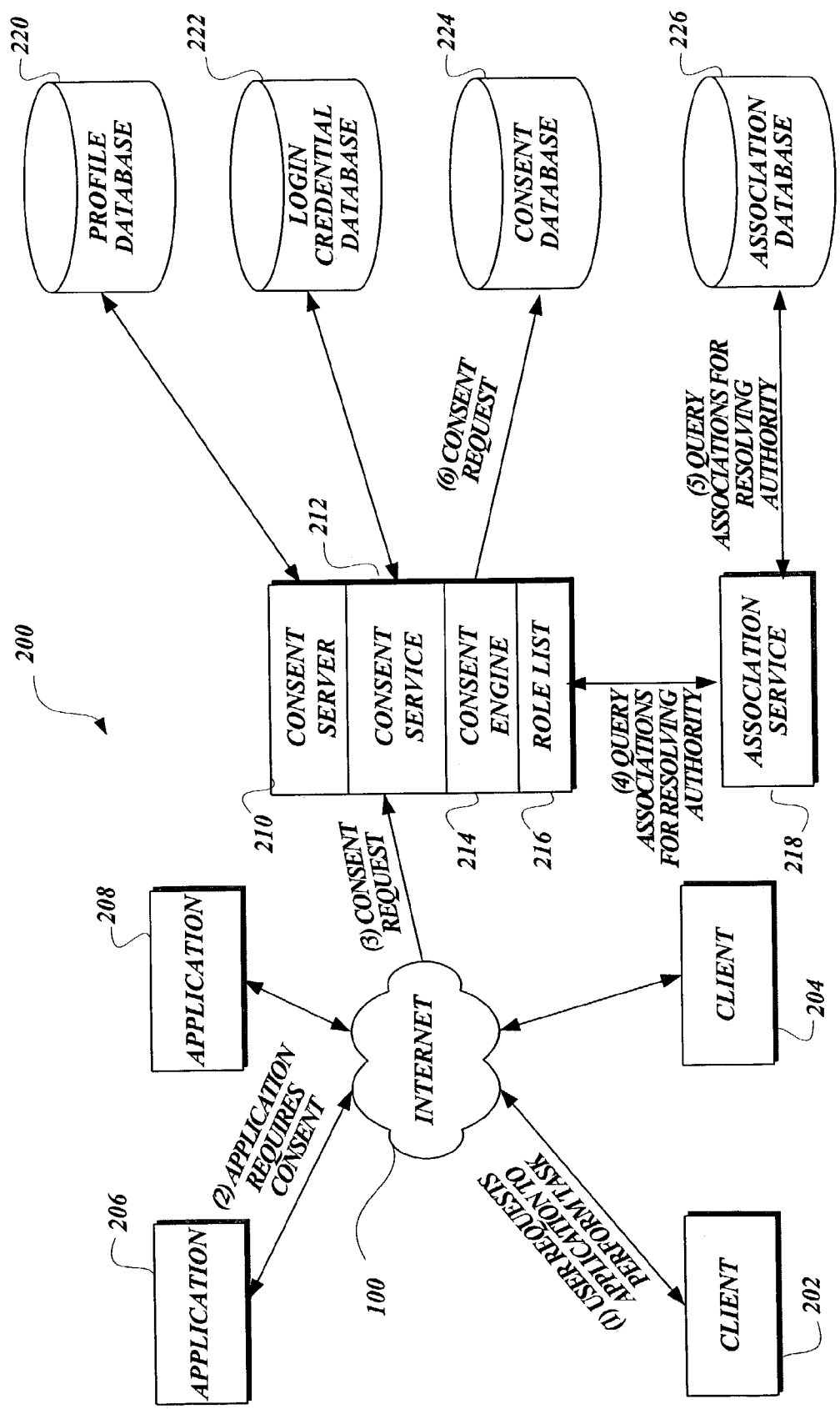
FIG. 2B is a block diagram of the system architecture of FIG. 2A illustrating submitting a consent request in accordance with one exemplary embodiment of the present invention.
Figure 2C:
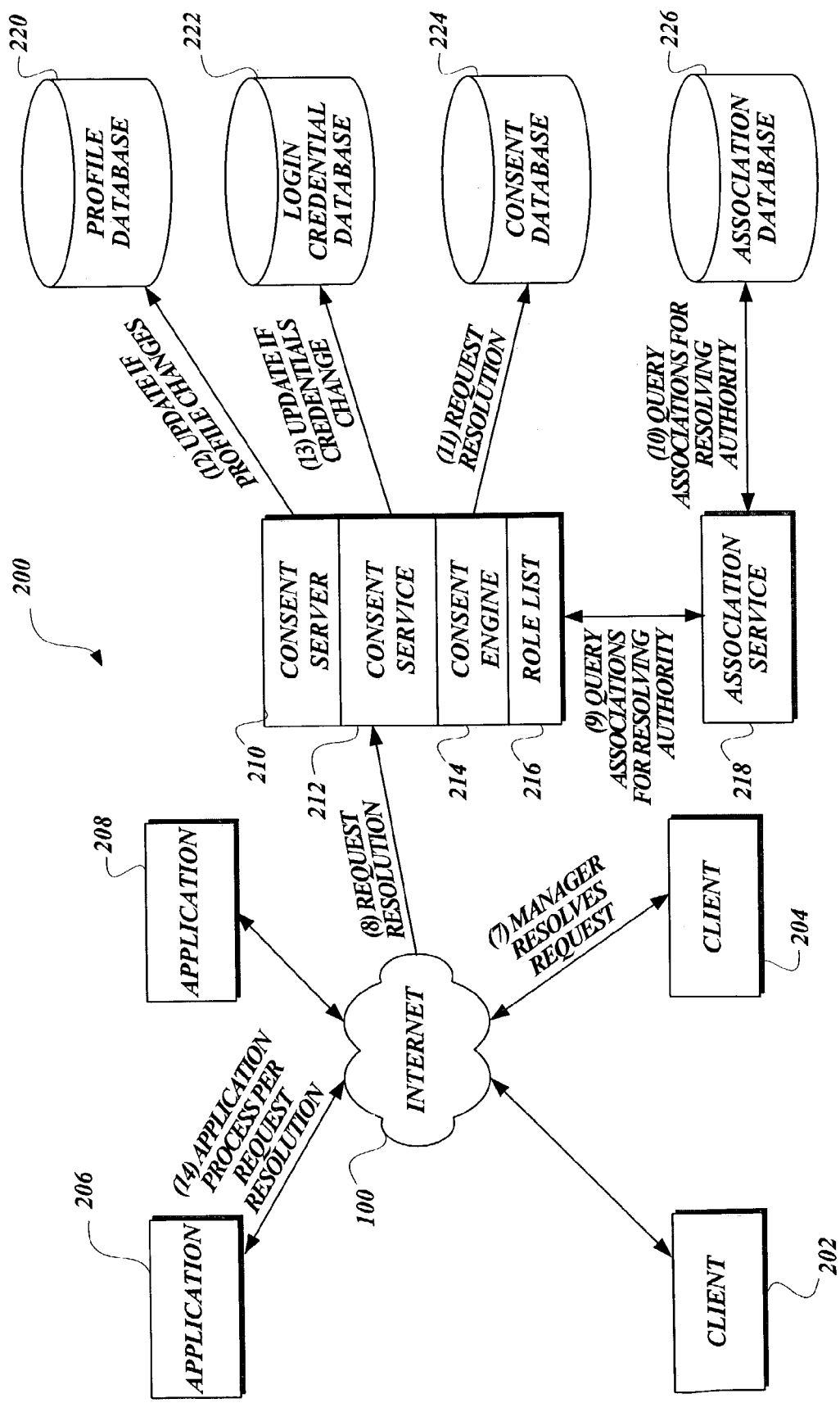
FIG. 2C is a block diagram of the system architecture of FIG. 2A illustrating resolving a consent request in accordance with one exemplary embodiment of the present invention.

FIGS. 2B and 2C are block diagrams illustrating managing consent requests in accordance with one exemplary embodiment of the present invention. FIG. 2B illustrates one embodiment of the present invention for submitting a consent request. With reference to FIG. 2B, a user of client 202 requests application 206 to perform a task. The application 206 determines that consent is required before the task can be performed. The application 206 sends a request for consent to perform the task on behalf of the user to the consent server 210. For example, the client 202 user may request to access a Web site or Web service that requires the consent to terms of use before access is allowed. The Web site or Web service application 206 may submit a request for consent to the terms of use to the consent server 210. The consent server 210 receives the consent request from the application 206 and queries the association service 218 to determine the online entity who has authority to resolve the consent request on behalf of the client 202 user. The association service 218 queries the association database 226 for the resolving authority associated with the client 202 user. The search results from the association database 226, which include the resolving authority, are returned to the consent server 210. The consent server 210 updates the consent database 224 to create an entry for the pending consent request. In one embodiment of the present invention, the consent database entry includes information about the entity requesting consent, the task, the resolving authority entity, and the request status, such as pending, approve, denied, and delete.

As another example of submitting a consent request, a client 202 user may request to access a Web site or Web service that requires access to the user's profile information prior to allowing access. In the United States, if the user is a child under the age of 13, the Web site is required by COPPA to obtain consent from an adult before accessing the child's profile information. The Web site or Web service application, acting on behalf of a child under the age of 13, may submit a request for consent from an adult to access the child's profile information. The consent server 210 may call the association service 218 to query associations between the child user and an adult that have been approved as having authority to resolve the request for consent to access the child's profile information. Those of ordinary skill in the art will readily appreciate that the present invention is not limited to the above-described examples and that the present invention may be practiced by any application or online entity that requires consent to perform a task.

FIG. 2C illustrates one embodiment of the present invention for resolving a consent request. With reference to FIG. 2C, the manager user of client 204 resolves a request for consent from the application 206 to perform a task on behalf of the client 202 user. The consent server 210 receives the request resolution from the client 204 manager. The consent server 210 queries the association service 218 to verify that the manager is the resolving authority for the client 202. The association service 218 queries the association database 226 for the resolving authority associated with the client 202 user. The association database 226 returns the resolving authority information to the association service 218. The association service 218 returns the resolving authority information to the consent server 210. The consent server 210 verifies that the identity of the resolving authority is valid.

The consent server 210 updates the consent database 224 in accordance with the request resolution information from the resolving authority. In one embodiment, the consent database 224 is updated so that the consent request entry indicates a resolved status of approve, deny, or delete. A consent request resolution may mean that the user's settings in the profile database 220 may need to be updated. For example, in one embodiment of the present invention, the profile database 220 may store settings, such as filters, for a user. The settings in the profile database 220 may need to be updated to correspond with the request resolution. For example, if a user's settings indicate that the user is not allowed to access a Web site or Web service and a consent request was resolved so that the user is allowed access to the Web site or Web service, the user's settings need to be updated to correspond with the request resolution. Similarly, a user's credentials may need to be updated to correspond to the request resolution. If so, the login credential database 222 is updated to be consistent with the request resolution.

Figure 3:
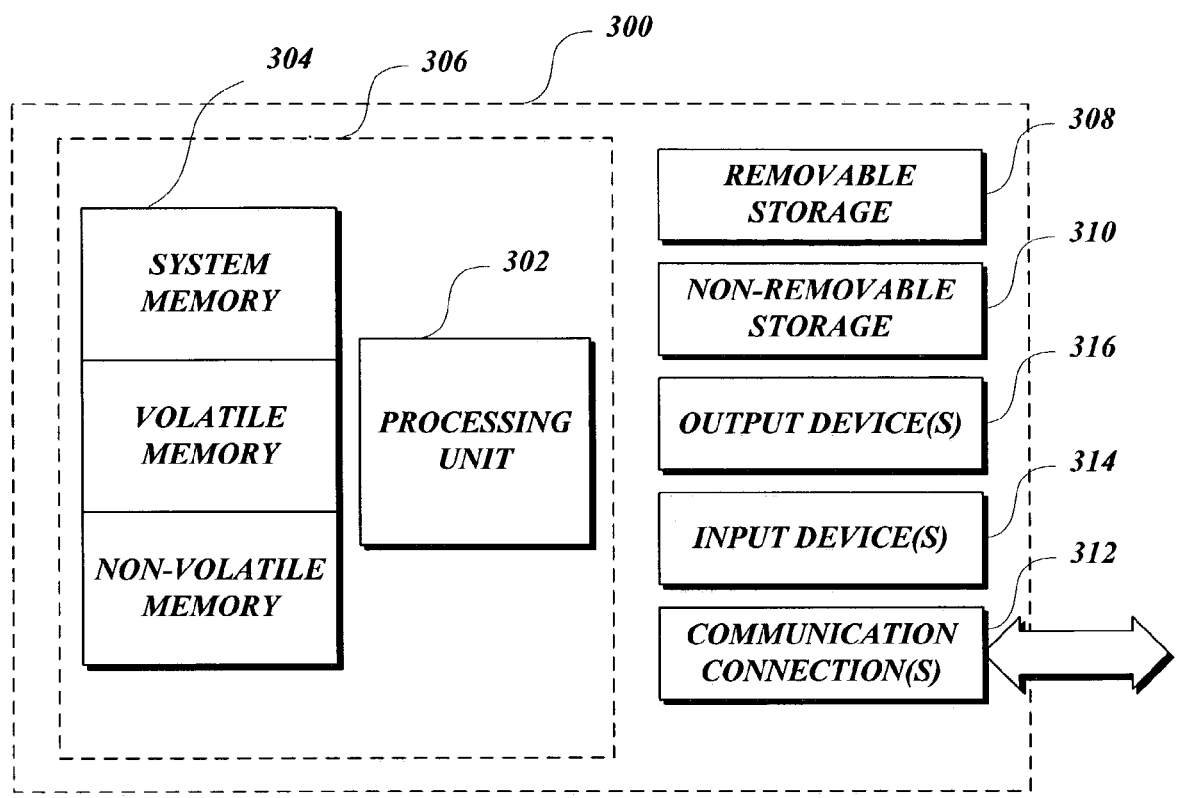
FIG. 3 is a block diagram illustrating an operating environment for one exemplary embodiment of the present invention.

FIG. 3 illustrates an exemplary device 300 for implementing the hereinafter-described aspects of the invention. In its most basic configuration, the device 300 typically includes at least one processing unit 302 and memory 304. Depending on the exact configuration and type of client device, memory 304 may be volatile (such as RAM), non-volatile (such as ROM, flash memory, etc.), or some combination of the two. This most basic configuration is illustrated in FIG. 3 by dashed line 306. The device 300 may also have additional features/functionality. For example, the device 300 may also include additional storage (removable and/or non-removable), including, but not limited to, magnetic or optical discs or tape. Such additional storage is illustrated in FIG. 3 by removable storage 308 and non-removable storage 310. Computer storage media include volatile and non-volatile and removable and non-removable media implemented in any method or technology for storage of information, such as computer-readable instructions, data structures, program modules, or other data. Memory 304, removable storage 308, and non-removable storage 310 are all examples of computer storage media. Computer storage media include, but are not limited to, RAM, ROM, an EEPROM, flash memory or other memory technology, CD-ROM, digital versatile disc (DVD) or other optical storage, magnetic cassettes, magnetic tape, magnetic disc storage or other magnetic storage devices, or any other medium that can be used to store the desired information and that can be accessed by device 300. Any such computer media may be part of the device 300.

The computer storage medium of the device 300 also contains computer programs and/or routines suitable for communicating with and processing information from remote computers, such as consent server 210, association service 218, and clients 202 and 204.

The device 300 may also contain communications connections 312 that allow the device to communicate with other devices. Communication connections 312 are examples of communication media. Communication media typically embody computer-readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example and not limitation, communication media include wired media, such as a wired network or a direct wired connection, and wireless media, such as acoustic, RF, infrared, and other wireless media. The term "computer-readable media," as used herein, includes both storage media and communication media.

The device 300 may also have input devices(s) 314, such as a keyboard, mouse, pen, voice input device, touch input device, etc. Output device(s) 316, such as a display, speakers, printer, etc., may also be included. Since all these devices are well known in the art, they are not described here.

The components of system 200 can be implemented utilizing the exemplary computing device described with reference to FIG. 3. For example, the clients 202 and 204 can be formed utilizing the exemplary computing device 300. Similarly, the consent server 210 can be formed utilizing the exemplary computing device 300. Additionally, the server upon which the association service 218, profile database 220, login credential database 222, consent database 224, and association database 226 reside can be formed utilizing the exemplary computing device 300. The computing device 300 is only one example of suitable computing environments and is not intended to suggest any limitation as to the scope of use or functionality of the invention. Neither should the computing environment be interpreted as having any dependency requirement relating to any one or a combination of components illustrated in the exemplary operating environment.

The invention is operational in numerous other general purpose or special computing system environments or configurations. Examples of well-known computing systems, environments, and/or configurations that may be suitable for implementing the invention include, but are not limited to, personal computers, server computers, laptop devices, multiprocessor systems, microprocessor-based systems, network PCs, minicomputers, mainframe computers, and distributed computing environments that include any of the above systems or the like.

FIGS. 4-7 are diagrams illustrating the interactions between exemplary components for managing consent requests in accordance with an exemplary embodiment of the present invention. FIGS. 4-7 illustrate interactions between application 206, consent server 210, and resolving authority 402. The interactions illustrated in FIGS. 4-7 demonstrate the asynchronous protocol utilized by the present invention for managing consent requests. The asynchronous protocol enables consent requests to be submitted, queried, and resolved in a manner that is not dependent on timing. The asynchronous protocol enables consent request information to be exchanged between the exemplary application 206, consent server 210, and resolving authority 402 components in a reliable manner that is less prone to error because the communications between the exemplary components do not rely on the timing of messages from other exemplary components.

As described above with reference to FIG. 2A, the consent server 210 may include a consent service 212 with an application programming interface ("API"). The consent service API may include methods for querying for a request, submitting a request, and resolving a request. In one embodiment, the interactions with the consent server 210 illustrated in FIGS. 4-7 may be performed utilizing the consent service API methods for querying for a request, submitting a request, and resolving a request. However, the invention is not so limited and other methods well known to those of ordinary skill in the art for transmitting messages between computing devices across a network, such as the Internet, may be utilized.

Figure 4:
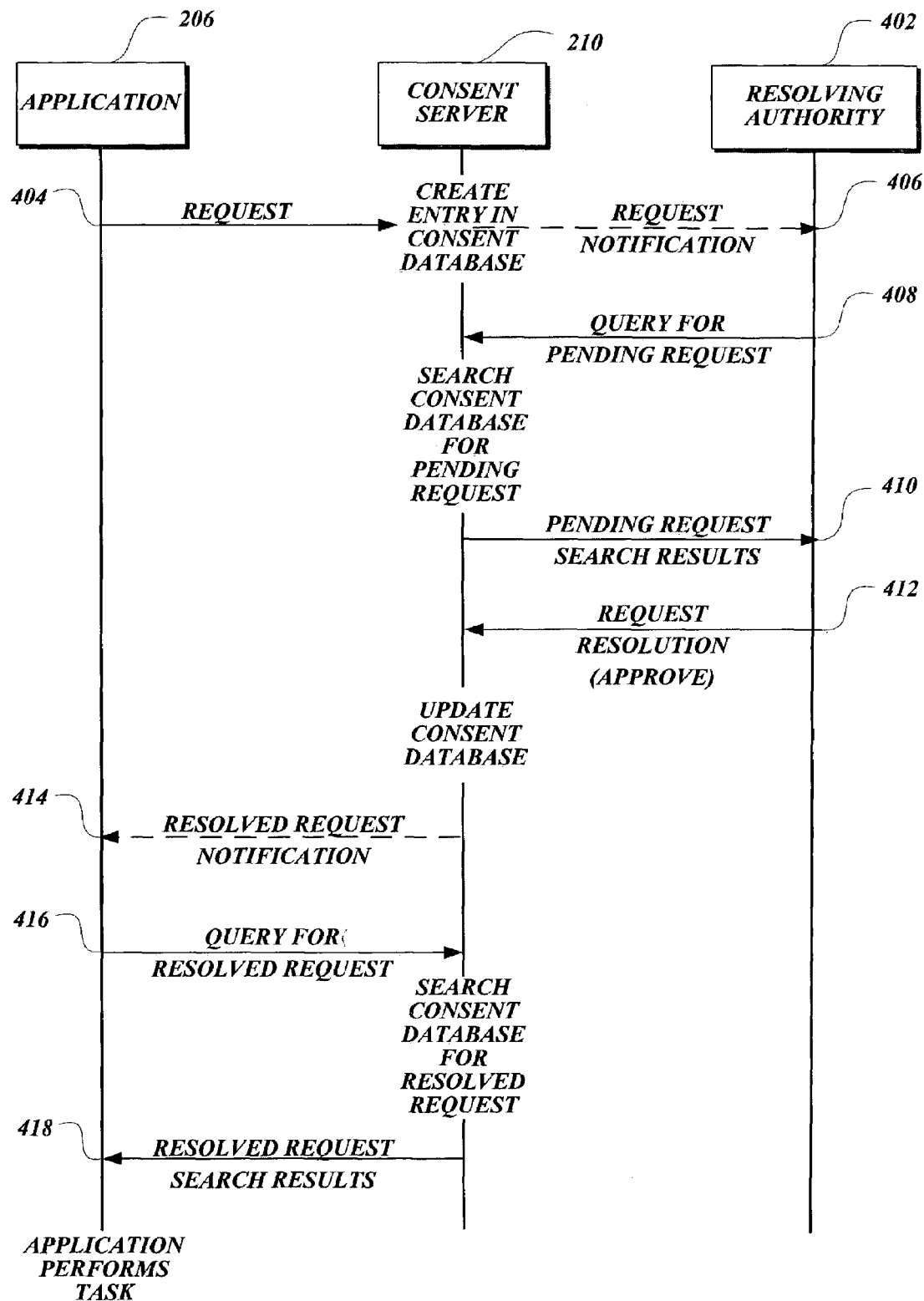
FIG. 4 is a diagram illustrating the interactions between exemplary components for approving a consent request in accordance with one embodiment of the present invention.

FIG. 4 illustrates interactions between application 206, consent server 210, and resolving authority 402 in which a consent request from application 206 is approved by the resolving authority 402 in accordance with one embodiment of the present invention. With reference to FIG. 4, the application 206, acting on behalf of a user, has determined that consent is required to perform an online task. The application 206 submits a request 404 for consent to perform the online task to the consent server 210. The consent server 210 updates the consent database 224 to create an entry for the pending consent request. Consent server 210 may send an optional pending request notification 406 to the resolving authority 402. The resolving authority 402 may submit a query for pending request 408 to the consent server 210. The consent server 210 receives the query for pending request from the resolving authority 402. The consent server 210 searches the consent database 224 for pending requests. The consent server 210 sends the pending request search results 410 to the resolving authority 402.

After the resolving authority 402 has obtained the pending request information, the resolving authority 402 sends approve request resolution 412 to the consent server 210. The consent server 210 updates the consent database 224 to indicate that the request status is approved. The consent server 210 may also send an optional resolved request notification 414 to the application 206. The application 206 may also send a query for resolved request 416 to the consent server 210. The consent server 210 searches the consent database 224 for resolved requests. The consent server 210 sends resolved request search results 418 to the application 206. Since the resolving authority 402 approved the consent request, the application 206 is allowed to perform the task on behalf of the user.

Figure 5:
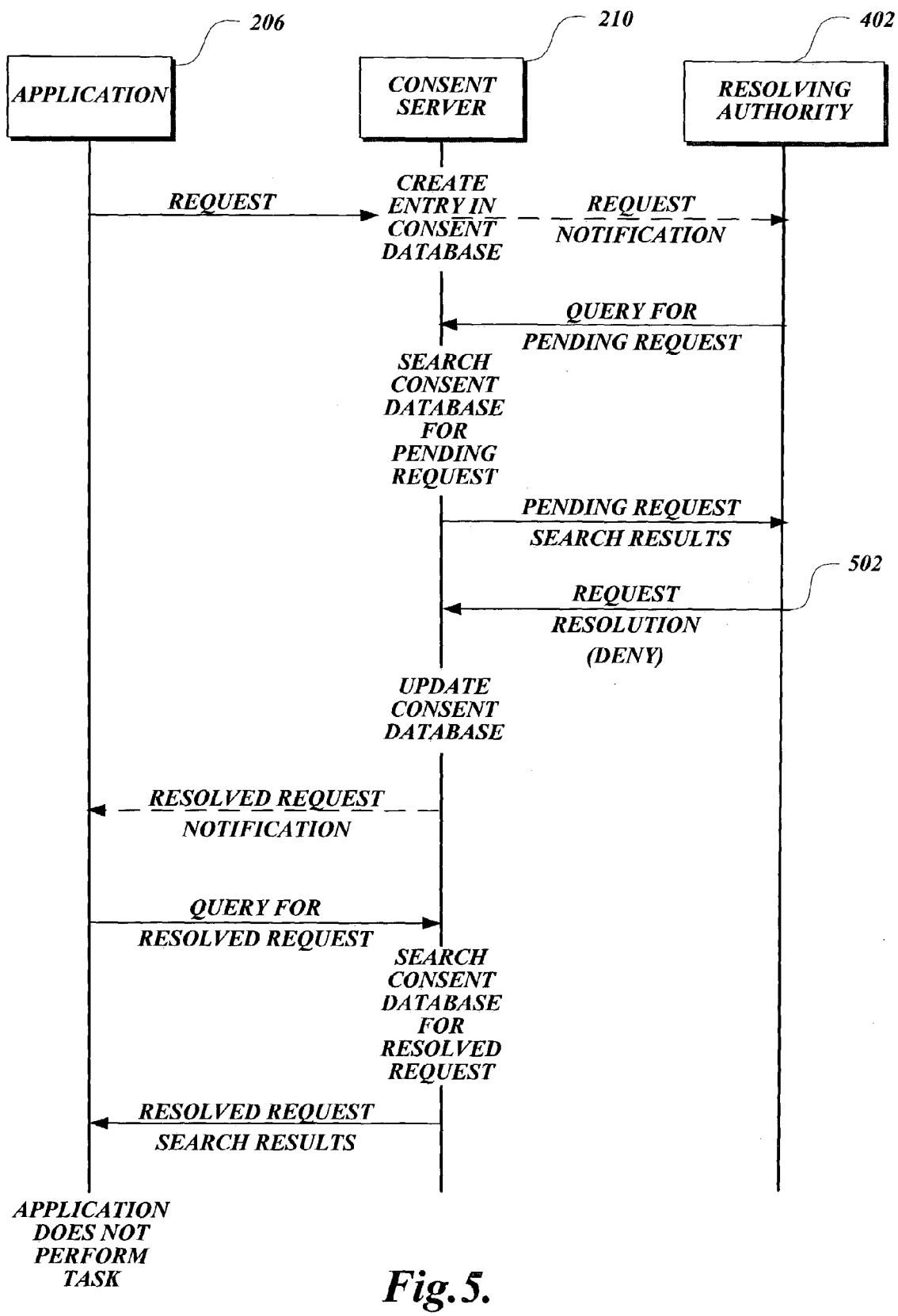
FIG. 5 is a diagram illustrating the interactions between exemplary components for denying a consent request in accordance with one embodiment of the present invention.

FIG. 5 illustrates interactions between application 206, consent server 210, and resolving authority 402 in which a consent request from application 206 is denied by the resolving authority 402 in accordance with one embodiment of the present invention. With reference to FIG. 5, the application 206 submits a request to the consent server 210. The resolving authority 402 obtains information about the pending request by an optional pending request notification or by submitting a query for pending request to the consent server 210. The resolving authority 402 sends a deny request resolution 502 to the consent server 210. The consent server 210 updates the consent database 224 to indicate that the request status is denied. The application 206 obtains information about the resolved request, either by an optional resolved request notification or by submitting a query for resolved request to the consent server 210. Since the resolving authority 402 denied the request, the application 206 is not allowed to perform the task on behalf of the user.

Figure 6:
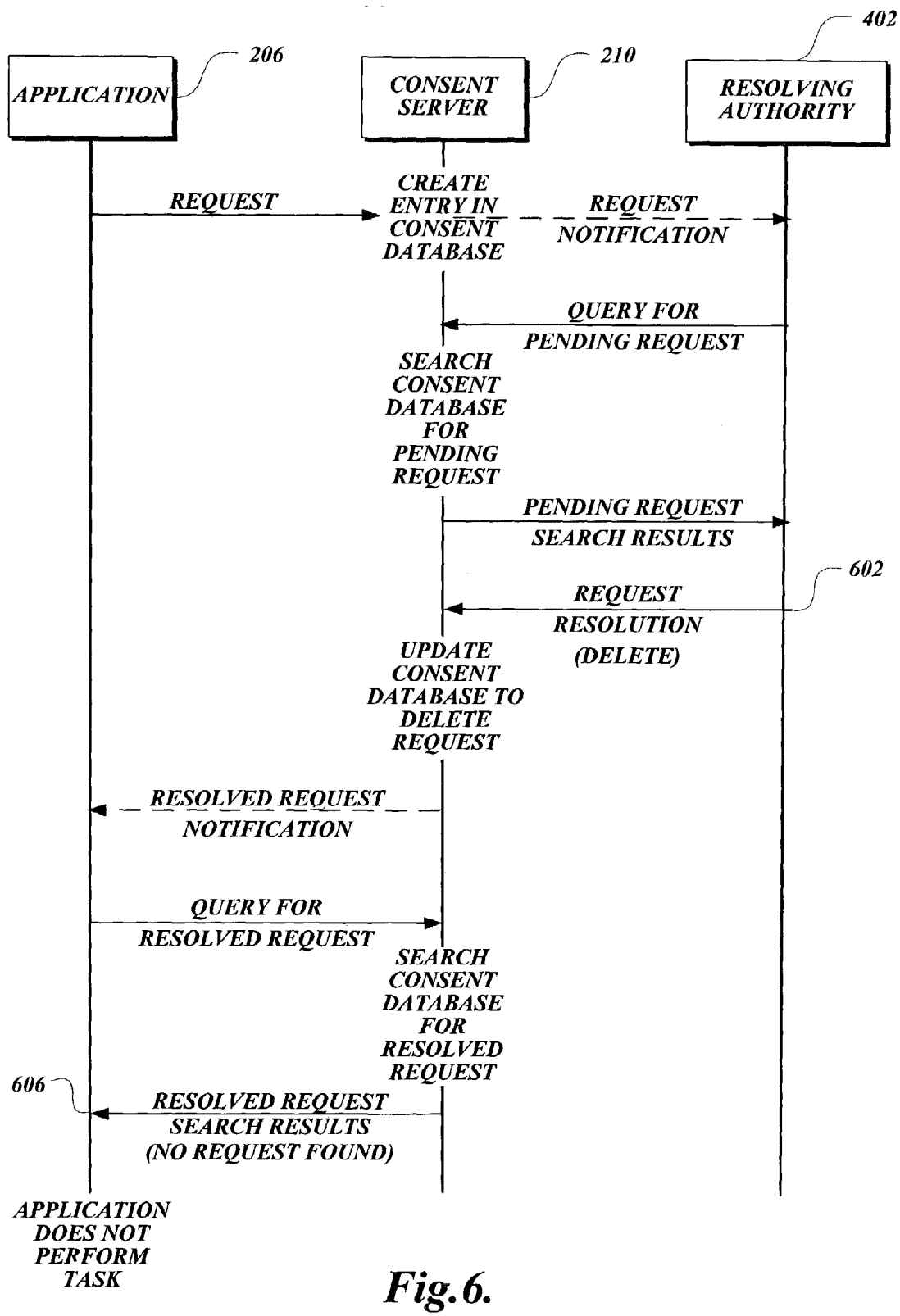
FIG. 6 is a diagram illustrating the interactions between exemplary components for deleting a consent request in accordance with one embodiment of the present invention.

FIG. 6 illustrates interactions between application 206, consent server 210, and resolving authority 402 in which a consent request from application 206 is deleted by the resolving authority 402 in accordance with one embodiment of the present invention. With reference to FIG. 6, the application 206 submits a request to the consent server 210. The resolving authority 402 obtains information about the pending request by an optional pending request notification or by submitting a query for pending request to the consent server 210. The resolving authority 402 sends a delete request resolution 602 to the consent server 210. The consent server 210 updates the consent database to delete the entry for the request. The application 206 obtains information about the resolved request, either by an optional resolved request notification or by submitting a query for resolved request to the consent server 210. Since the consent server 210 deleted the consent request in accordance with the request resolution from the resolving authority 402, no resolved requests are found in the consent database 224 and application 206 is not allowed to perform the task.

Figure 7:
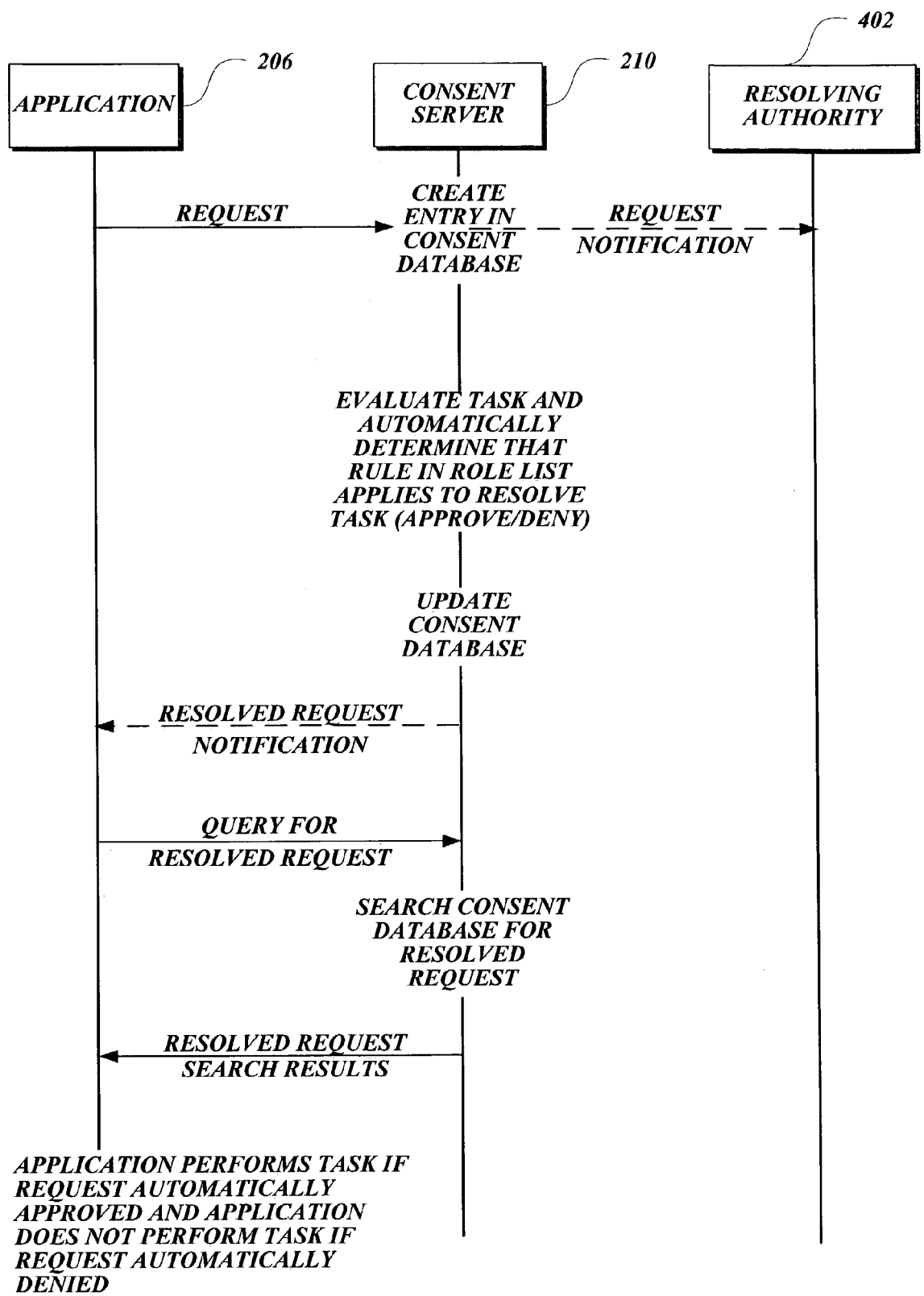
FIG. 7 is a diagram illustrating the interactions between exemplary components for automatically resolving a consent request in accordance with one embodiment of the present invention.

FIG. 7 illustrates interactions between application 206, consent server 210, and resolving authority 402 in which a consent request from application 206 is automatically resolved in accordance with one embodiment of the present invention. With reference to FIG. 7, the application 206 submits a request for consent to perform task on behalf of a user to the consent server 210. The consent server 210 creates an entry in the consent database 224 for the pending request. The consent server 210 may also send an optional pending request notification to the resolving authority 402.

As described above with reference to FIG. 2A, one embodiment of the present invention includes a consent server 210 upon which role list 216 resides. The role list 216 includes an ordered list of rules that are used for providing the automatic resolution feature of the present invention. Each rule in the role list 216 includes a task syntax and a rule definition. The task syntax is a schema utilized for describing and validating task data. The rule definition specifies how a request for consent to perform a task is to be resolved. For example, a role list for a parent may include a rule that access to all sites be approved for the child. As another example, a manager role list may include a rule that any request from the manager be approved. A rule may be defined by an online entity, such as an application acting on behalf of a user. For example, a parental controls application acting on behalf of a parent may define a rule. After the task syntax and rule definition have been defined by the online entity and stored in the role list 216, the consent server 210 may use the role list to evaluate consent requests for providing automatic request resolution. After the rule for resolving a consent request for a task and the task syntax have been defined by the online entity and stored in the role list 216, the consent server 210 may use the rule to evaluate consent requests and determine if the consent request can be automatically resolved.

With reference to FIG. 7, after the consent server 210 receives the consent request, the consent server 210 evaluates the task that application 206 has requested consent to perform on behalf of the user. The consent server 210 evaluates the task to determine if the task should be automatically approved. In one embodiment, the consent engine 214 evaluates consent requests to determine if a rule in the role list 216 applies to the task corresponding to the consent request. In one embodiment, the consent engine 214 validates the task data for the consent request to determine if the task data conforms to a specified task syntax or schema. If the task data conforms to a task syntax or schema, the consent engine 214 evaluates the task data against the ordered list of rules in the role list 216 to determine if a rule applies to the consent request task. If a rule applies to the consent request task, the consent engine 214 uses the rule definition to automatically approve or deny the consent request. If the rule definition applies to the consent request such that the consent request is to be approved, the consent engine 214 updates the consent database 224 to indicate that the consent is approved. If the rule definition applies to the consent request such that the consent request is to be denied, the consent engine 214 updates the consent database 224 to indicate that the consent is denied. If the consent engine 214 determines that no rule in the role list 216 applies to the consent request task, the consent request remains in a pending status and is not automatically resolved. Consent requests that are not automatically resolved are resolved by the resolving authority as described above with reference to FIGS. 4-6.

In the illustrated example shown in FIG. 7, the consent server 210 has determined that a rule in the role list 216 applies such that the consent request is automatically resolved as approved or denied. The application 206 obtains information about the automatically resolved request either by receiving an optional resolved request notification or by submitting a query for resolved requests. If the request is automatically resolved to be approved, in accordance with a rule in the role list 216, the application 206 is allowed to perform the task. Alternatively, if the request for consent to perform the task is automatically resolved to be denied, in accordance with a rule in the role list 216, the application 206 is not allowed to perform the task.

Figure 8:
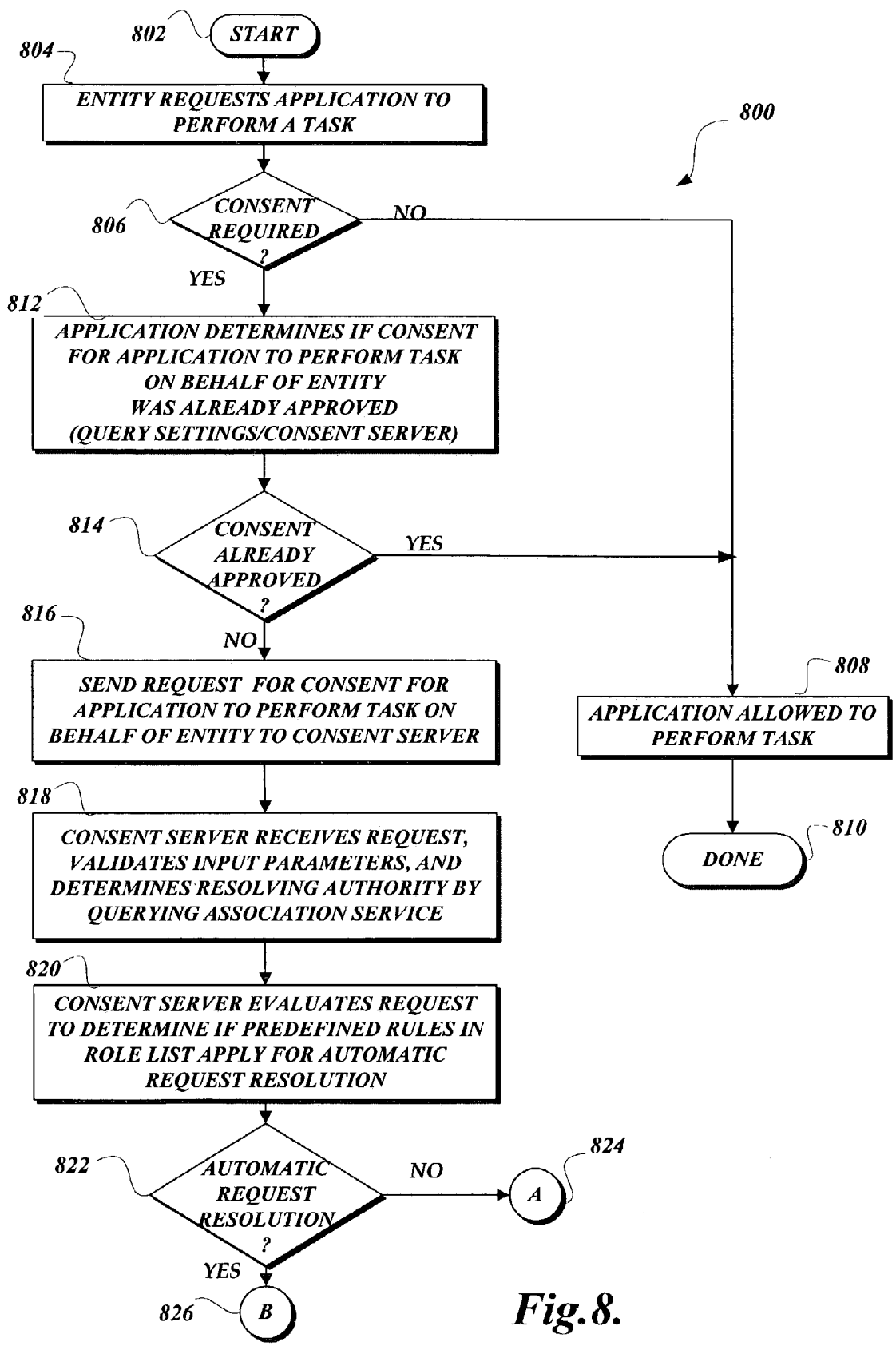
FIGS. 8, 9A, and 9B are flow diagrams illustrating the logic utilized by an exemplary embodiment of the present invention for managing consent requests for online entities.

FIG. 8 illustrates a routine 800 for managing consent requests in accordance with one embodiment of the present invention. Routine 800 starts at block 802 and proceeds to block 804 where an entity requests an application to perform a task. For example, a Web browser application acting on behalf of a user may request access to a Web site or Web service. After an entity requests an application to perform a task at block 804, routine 800 proceeds to decision block 806. At decision block 806, a test is made to determine if consent is required for the application to perform the task. For example, a Web site or Web service may require consent to terms of use the first time a browser application, on behalf of a user, accesses the Web site or Web service. As another example, a Web site or Web service may require consent when the terms of use have changed. As an additional example, a Web site may require consent from an adult to access the profile information for a child under the age of 13 residing in the United States who is requesting access to the Web site or Web service. As a further example, a user of a managed online account may wish to perform an online action that requires the consent of the manager or administrator of the online account.

If at decision block 806, it is determined that consent is not required, routine 800 proceeds to block 808 and the application is allowed to perform the task. After allowing the application to perform the task at block 808, routine 800 proceeds to block 810 and is completed.

Alternately, if at decision block 806, it is determined that consent is required, routine 800 proceeds to block 812. At block 812, the application determines if consent for the application to perform the task on behalf of the user was already approved. In one embodiment, the application determines if consent was already approved by querying the consent server 210. As described above with reference to FIGS. 2A-2C, the consent server 210 includes a consent service 212. In one embodiment of the present invention, the consent service interface includes an application programming interface with methods for submitting a request, resolving a request, and querying for a request. In another embodiment, the application queries settings in the profile database 220. In yet another embodiment, the application may determine if consent to perform the task is already approved by checking its local cache.

After determining if consent to perform the task was already approved at block 812, routine 800 proceeds to decision block 814. At decision block 814, a test is performed to determine if consent has already been approved. If at decision block 814, it is determined that consent is already approved, routine 800 proceeds to block 808 and the application is allowed to perform the task. After allowing the application to perform the task at block 808, routine 800 proceeds to block 810 and is completed.

If at decision block 814, it is determined that consent was not already approved, routine 800 proceeds to block 816. At block 816, routine 800 submits a request for consent for the application to perform the task on behalf of the entity to the consent server 210. After submitting the consent request at block 816, routine 800 proceeds to block 818. At block 818, the consent server 210 receives the consent request, validates the input parameters, and determines the resolving authority. As described above with reference to FIGS. 2A-2C, one embodiment of the present invention determines the resolving authority by querying an association service 218, which in turn queries the association database 226 for resolving authority information. In another embodiment, the input parameters include task data and specify a schema for the task data. The consent server 210 validates the input parameters to confirm that the task data conforms with the specified schema. After validating the input parameters and determining the resolving authority at block 818, routine 800 proceeds to block 820.

At block 820, the consent server evaluates the consent request to determine if predefined rules in the role list 216 apply for automatic resolution. As discussed above with reference to FIG. 7, the consent engine 214 residing on the consent server 210 evaluates the task data against the ordered list of rules to determine if a rule applies to the consent request task. If a rule applies to the consent request task, the consent engine 214 uses the rule definition to automatically approve or deny the consent request. After evaluating the request to determine if predefined rules in the role list apply for automatic resolution at block 820, routine 800 proceeds to decision block 822. At decision block 822, a test is made to determine if automatic request resolution is to be performed.

If at decision block 822, it is determined that automatic request resolution is not to be performed, routine 800 proceeds to block 824 and performs the steps that are described below with reference to FIG. 9A. As described above, it is determined that automatic request resolution is not to be performed when no predefined rule in the role list 216 applies to the task. If at decision block 822, it is determined that automatic request resolution is to be performed, routine 800 proceeds to block 826 and performs the steps that are described below with reference to FIG. 9B.

Figure 9A:
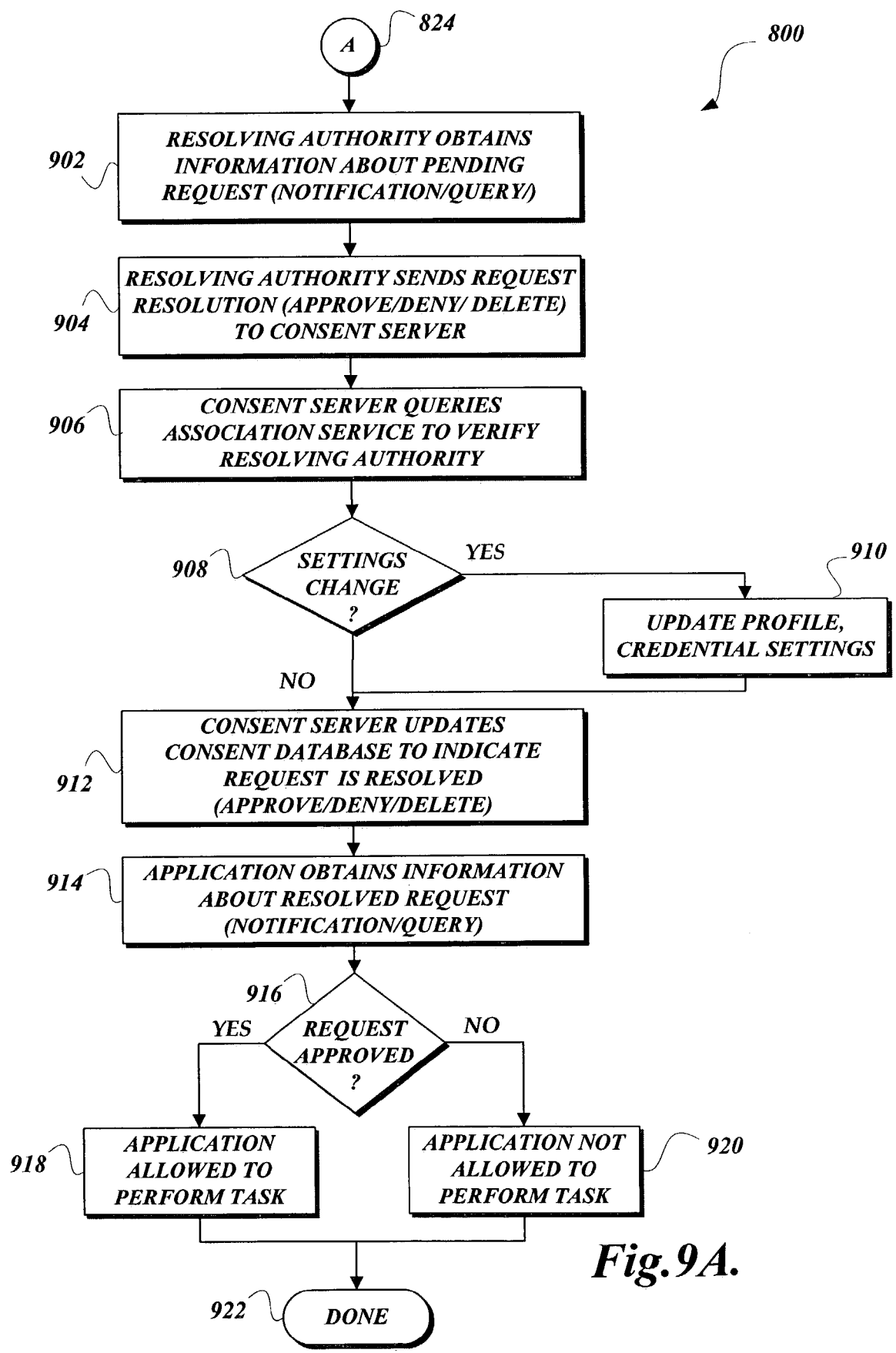

FIG. 9A illustrates the steps performed by routine 800 when it is determined at decision block 822 that automatic request resolution is not performed. The process of resolving a request when automatic request resolution does not apply was described above with reference to FIGS. 4-6. After determining that automatic request resolution is not to be performed, routine 800 proceeds from block 824 to block 902. At block 902, the resolving authority obtains information about the pending request. In one embodiment of the present invention, an optional notification of the pending request is sent to the resolving authority. In another embodiment of the present invention, the resolving authority submits a query for pending requests to the consent server 210.

After the resolving authority obtains information about the pending requests at block 902, routine 800 proceeds to block 904. At block 904, the resolving authority submits a request resolution to the consent server 210. The request resolution may be to approve, deny, or delete the consent request. After the resolving authority submits a request resolution to the consent server 210 at block 904, routine 800 proceeds to block 906. At block 906, routine 800 verifies the resolving authority identity. In one embodiment of the present invention, the identity of the resolving authority is verified utilizing the association service 218 as described above with reference to FIGS. 2A-2C.

After verifying the resolving authority at block 906, routine 800 proceeds to decision block 908. At decision block 908, a test is made to determine if settings for the user need to be updated to correspond with the resolved request. If at decision block 908, it is determined that the settings need to be updated, routine 800 proceeds to block 910 to update the user's settings. In one embodiment of the present invention, the user's settings are stored in the profile database 220 and the login credential database 222. After updating the user's settings at block 910, routine 800 proceeds to block 912. If at decision block 908, it is determined that the settings do not need to be updated, routine 800 proceeds to block 912. At block 912, the consent database 224 is updated to indicate that the request is resolved as approved, denied, or deleted in accordance with the request resolution. After updating the consent database 224 to indicate that the request is resolved at block 912, routine 800 proceeds to block 914. At block 914, the application obtains information about the resolved request. In one embodiment of the present invention, an optional request resolution notification is sent to the application. In another embodiment of the present invention, the application submits a query to the consent server 210 for resolved requests.

After the application obtains information about the resolved request at block 914, routine 800 proceeds to decision block 916. At decision block 916, a test is performed to determine if the request was approved. If at decision block 916, it is determined that the request is approved, routine 800 proceeds to block 918 and the application is allowed to perform the task. After allowing the application to perform the task at block 918, routine 800 proceeds to block 922 and is completed. If at decision block 916, it is determined that the request was not approved, routine 800 proceeds to block 920 and the application is not allowed to perform the task. From block 920, routine 800 proceeds to block 922 and is completed.

Figure 9B:
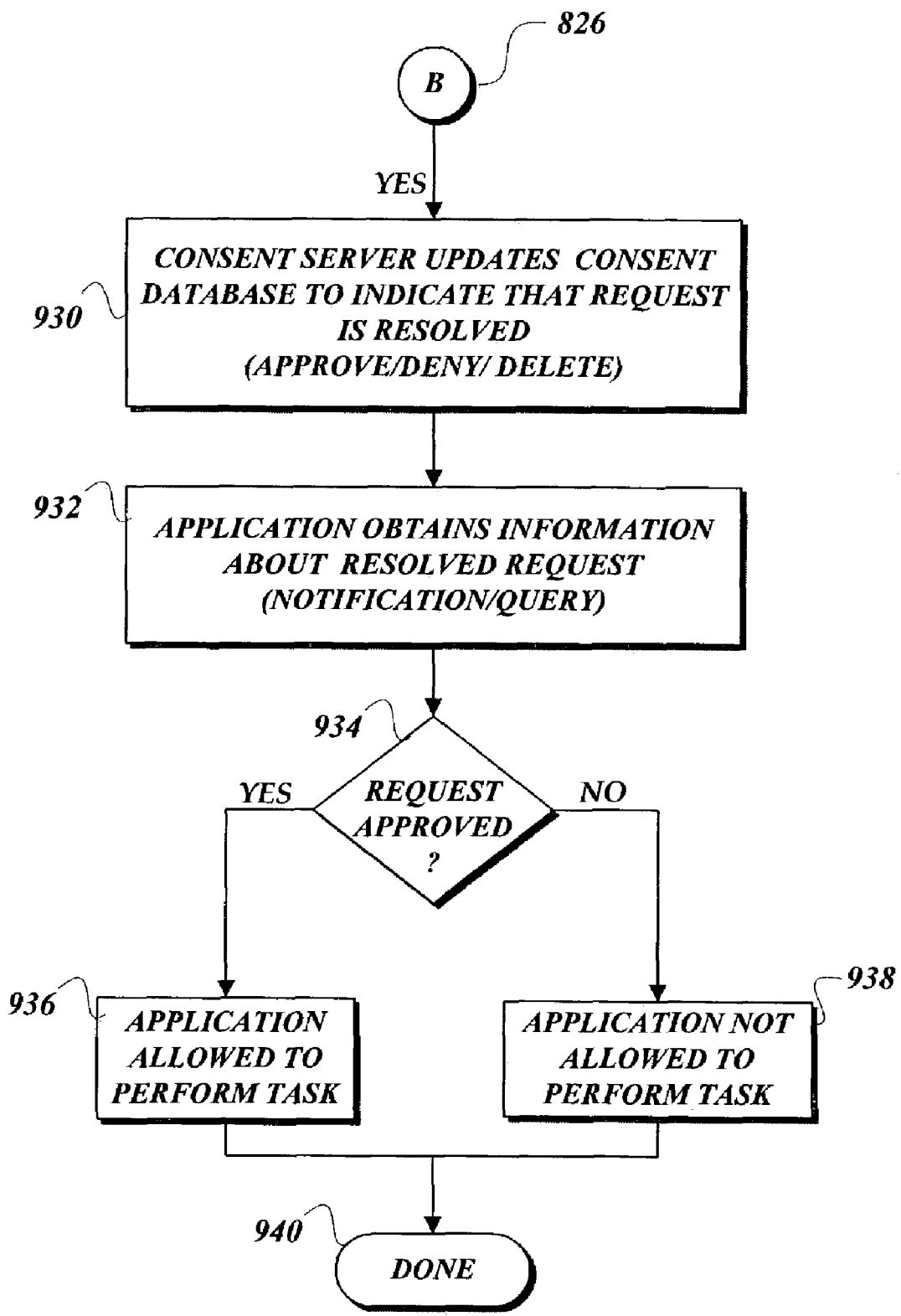

FIG. 9B illustrates the steps performed by routine 800 when it is determined at decision block 822 that automatic request resolution is to be performed. The process of performing automatic request resolution is described above with reference to FIG. 7. After determining that automatic request resolution is to be performed, routine 800 proceeds from block 826 to block 930. At block 930, routine 800 updates the consent database 224 to indicate that the request is resolved in accordance with the predefined rule in the role list 216. After updating the consent database to indicate that the request is resolved at block 930, routine 800 proceeds to block 932 wherein the application obtains information about the resolved request. The application may obtain information about the resolved request by receiving an optional resolved request notification or by submitting a query for resolved request to the consent server 210.

After the application obtains information about the resolved request at block 932, routine 800 proceeds to decision block 934. At decision block 934, a test is made to determine if the request is approved. If at decision block 934, it is determined that the request is approved, routine 800 proceeds to block 936 and the application is allowed to perform the task. After allowing the application to perform the task at block 936, routine 800 is completed at block 940. If at decision block 934, it is determined that the request is not approved, routine 800 proceeds to block 938 and the application is not allowed to perform the task. From block 938, routine 800 proceeds to block 940 and is completed.

With reference once again to FIG. 2A, an alternative embodiment of the present invention, the components of the system 200 may be implemented as distributed software components accessible via the communication network. An example of a distributed application development and execution platform is the Microsoft® .NET platform from Microsoft® Corporation of Redmond, Wash. Generally described, the Microsoft® .NET platform is an application programming and execution platform that provides write-once, compile-once, run-anywhere application development. Microsoft® .NET platform applications may be created in any language as long as they are compiled by a compiler that targets the Microsoft®.NET universal runtime ("URT"), also known as the "common language runtime engine." Such a compiler compiles .NET applications into intermediate language ("IL") rather than directly into executable code.

To execute a .NET platform application, the compiled IL is interpreted, or "just-in-time" compiled, by the URT into native machine instructions. The native machine instructions can then be directly executed by the CPU. The Microsoft® .NET platform also includes a base library that comprises a large set of class libraries and services. These libraries and services provide access to the features of the URT, and other high-level services, so that software developers do not have to code the same services repeatedly. Although the present invention may be applicable with regard to a .NET platform implementation, the present invention may also be implemented in alternative platform environments.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer system for resolving user online requests to perform tasks, comprising:
   (a) a plurality of applications remotely connected via a network to users for:
      (i) receiving online requests ("task requests") from the users to perform tasks;
      (ii) submitting consent requests to perform the tasks;
      (iii) querying for resolutions of consent requests; and
      (iv) performing or not performing the tasks in accordance with resolutions of the consent requests;
   (b) a consent component connected to the plurality of applications via a network for:
      (i) receiving the consent requests from the plurality of applications for consent from an authority authorized to resolve the task requests to perform the tasks requested by the users whose tasks are controlled by the authority;
      (ii) storing the consent requests;
      (iii) providing stored consent requests in response to queries from a resolving authority component;
      (iv) resolving stored consent requests in accordance with instructions from a resolving authority component; and
      (v) providing resolved stored consent requests in response to queries from the plurality of applications;
   (c) a resolving authority component connected to the consent component via a network for:
      (i) submitting a query to the consent component for stored consent requests;
      (ii) receiving stored consent requests from the consent component in response to the query;
      (iii) determining which authority of a plurality of authorities is associated with the users requesting the performance of the tasks and authorized to resolve the consent requests;
      (iv) requesting authorization instructions ("authorization") from the authority regarding the performance of the tasks associated with the stored consent requests;
      (v) obtaining authorization instructions from the authority regarding the performance of the tasks associated with the stored consent requests; and
      (vi) instructing the consent component to resolve the pending consent requests in accordance with the authorization instructions received from the authority associated with the users requesting the performance of the tasks and authorized to resolve the consent requests; and
   (d) at least one server for providing consent component and resolving authority component services, the server having a memory.

2. The computer system claimed in claim 1, wherein said consent component also evaluates the tasks to determine if automatic determination rules apply to the tasks and, if an automatic determination rule applies to a particular task, consenting or not consenting to the performance of the particular task based on the applicable automatic determination rule, and resolving the associated stored consent request in accordance with this automatic determination rule without receiving instructions from the resolving authority component.

3. The computer system claimed in claim 1, wherein the authority provides authorization instructions selected from the set consisting of approval instructions and denial instructions, wherein approval instructions indicate consent to the performance of the tasks and denial instructions indicate denial of consent to the performance of the tasks.

4. The computer system claimed in claim 3, wherein the set of authorization instructions further consists of delete instructions, wherein delete instructions indicate denial of consent to the performance of the task and that the stored consent request should be deleted from storage.

5. The computer system claimed in claim 1, including at least one related database.

6. The computer system claimed in claim 5, wherein (i) said consent component and resolving authority component services include an association service for determining an authority of a plurality of authorities authorized to resolve the consent requests and associated with the users requesting the performance of the tasks and (ii) said at least one related database includes an association database that stores information about the plurality of authorities and their associations with the users requesting the performance of the tasks.

7. The computer system claimed in claim 6, wherein said consent component and resolving authority component services also include a consent service and a consent database.

8. The computer system claimed in claim 7, wherein said at least one server also includes a consent engine.

9. The computer system claimed in claim 8, wherein said at least one related database also includes a profile database and a login credential database.

10. The computer system as claimed in claim 1, wherein the consent component sends a notification to the resolving authority component after receiving a consent request from the plurality of applications.

11. The computer system as claimed in claim 1, wherein the consent component sends a notification to the plurality of applications after resolving a stored consent request.

12. A computer-implemented method for resolving user online requests to perform tasks performed by a plurality of applications, the computer-implemented method including a consent component network connected to the plurality of applications, and a resolving authority component network connected to the consent component, the computer-implemented method comprising:
 (a) the plurality of applications:
  (i) receiving online requests ("task requests") from the users to perform tasks;
  (ii) submitting consent requests to perform the tasks;
  (iii) querying for resolutions of consent requests; and
  (iv) performing or not performing the tasks in accordance with resolutions of the consent requests;
 (b) the consent component:
  (i) receiving the consent requests from the plurality of applications for consent from an authority authorized to resolve the task requests to perform the tasks requested by the users whose tasks are controlled by the authority;
  (ii) storing the consent requests;
  (iii) providing stored consent requests in response to queries from a resolving authority component;
  (iv) resolving stored consent requests in accordance with instructions from a resolving authority component; and
  (v) providing resolved stored consent requests in response to queries from the plurality of applications; and
 (c) the resolving authority component:
  (i) submitting a query to the consent component for stored consent requests;
  (ii) receiving stored consent requests from the consent component in response to the query;
  (iii) determining which authority of a plurality of authorities is associated with the users requesting the performance of the tasks and authorized to resolve the consent requests;
  (iv) requesting authorization instructions ("authorization") from the authority regarding the performance of the tasks associated with the stored consent requests;
  (v) obtaining authorization instructions from the authority regarding the performance of the tasks associated with the stored consent requests; and
  (vi) instructing the consent component to resolve the pending consent requests in accordance with the authorization instructions received from the authority associated with the users requesting the performance of the tasks and authorized to resolve the consent requests.

13. The method of claim 12, wherein the method further comprises the consent component:
 evaluating the tasks to determine if automatic determination rules apply to the tasks and, if an automatic determination rule applies to a particular task, consenting or not consenting to the performance of the particular task based on the applicable automatic determination rule; and
 resolving the associated stored consent request in accordance with this automatic determination rule without receiving instructions from the resolving authority component.

14. The method of claim 12, wherein the method further comprises the resolving authority providing authorization instructions selected from the set consisting of approval instructions and denial instructions, wherein approval instructions indicate consent to the performance of the tasks and denial instructions indicate denial of consent to the performance of the tasks.

15. The method of claim 14, wherein the set of authorization instructions further consists of delete instructions, wherein delete instructions indicate denial of consent to the performance of the task and that the stored consent request should be deleted from storage.

16. The method of claim 12, wherein the method further comprises the consent component sending a notification to the resolving authority component after receiving a consent request from the plurality of applications.

17. The method of claim 12, wherein the method further comprises the consent component sending a notification to the plurality of applications after resolving a stored consent request.

18. Computer-readable storage media containing computer-executable instructions that, when executed by a processor, resolve user online requests to perform tasks requested by a plurality of applications remotely connected via a network to users, wherein, when an application is executed by a processor, the application causes the processor to: (i) receive online requests ("task requests") from the users to perform tasks; (ii) submit consent requests to perform the tasks; (iii) query for resolutions of consent requests; and (iv) perform or not perform the tasks in accordance with resolutions of the consent requests; the computer-executable instructions comprising:
 (a) a consent component for:
  (i) receiving the consent requests from the plurality of applications for consent from an authority authorized to resolve the task requests to perform the tasks requested by the users whose tasks are controlled by the authority;

(ii) storing the consent requests;

(iii) providing stored consent requests in response to queries from a resolving authority component;

(iv) resolving stored consent requests in accordance with instructions from a resolving authority component; and (v) providing resolved stored consent requests in response to queries from the plurality of applications; and (b) a resolving authority component for:

(i) submitting a query to the consent component for stored consent requests;

(ii) receiving stored consent requests from the consent component in response to the query;

(iii) determining which authority of a plurality of authorities is associated with the users requesting the performance of the tasks and authorized to resolve the consent requests;

(iv) requesting authorization instructions ("authorization") from the authority regarding the performance of the tasks associated with the stored consent requests;

(v) obtaining authorization instructions from the authority regarding the performance of the tasks associated with the stored consent requests; and (vi) instructing the consent component to resolve the pending consent requests in accordance with the authorization instructions received from the authority associated with the users requesting the performance of the tasks and authorized to resolve the consent requests.

19. The computer-readable storage media of claim 18, wherein the consent component also:

evaluates the tasks to determine if automatic determination rules apply to the tasks and, if an automatic determination rule applies to a particular task, consents or does not consent to the performance of the particular task based on the applicable automatic determination rule; and resolves the associated stored consent request in accordance with this automatic determination rule without receiving instructions from the resolving authority component.

20. The computer-readable storage media of claim 18, wherein the resolving authority also provides authorization instructions selected from the set consisting of approval instructions and denial instructions, wherein approval instructions indicate consent to the performance of the tasks and denial instructions indicate denial of consent to the performance of the tasks.

* * * * *